(12) United States Patent
Someya (10) Patent No.: US 9,518,565 B2
(45) Date of Patent: Dec. 13, 2016

(54) ACTUATOR

(71) Applicant: CASIO COMPUTER CO., LTD., Shibuya-ku, Tokyo (JP)

(72) Inventor: Kaoru Someya, Kiyose (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 337 days.

(21) Appl. No.: 14/253,540

(22) Filed: Apr. 15, 2014

(65) Prior Publication Data

US 2014/0319965 A1 Oct. 30, 2014

(30) Foreign Application Priority Data

Apr. 24, 2013 (JP) .................................. 2013-090898

(51) Int. Cl.
*H02N 2/04* (2006.01)
*F03G 7/00* (2006.01)

(52) U.S. Cl.
CPC .................................... *F03G 7/005* (2013.01)

(58) Field of Classification Search
CPC ..... H02N 2/026; H02N 2/103; B06B 1/06888; H04R 17/005; H01L 41/093; H01L 41/0478; H01L 41/193
USPC ............................ 310/323.16, 365, 367, 800
See application file for complete search history.

(56) References Cited

U.S. PATENT DOCUMENTS

| | | | | |
|---|---|---|---|---|
| 2008/0056515 A1* | 3/2008 | Hama | ................... | B06B 1/0618 |
| | | | | 381/191 |
| 2008/0061656 A1* | 3/2008 | Kim | .................... | H01L 41/0986 |
| | | | | 310/330 |
| 2011/0121691 A1* | 5/2011 | Ikushima | ................ | F03G 7/005 |
| | | | | 310/367 |
| 2013/0318961 A1* | 12/2013 | Hongo | .................... | F03G 7/065 |
| | | | | 60/528 |

FOREIGN PATENT DOCUMENTS

| | | |
|---|---|---|
| JP | 2000133854 A | 5/2000 |
| JP | 2008-193893 A | 8/2008 |

OTHER PUBLICATIONS

English Translation of JP 2000-133854, Shigeru.*
Japanese Office Action (and English translation thereof) dated Apr. 7, 2015, issued in counterpart Japanese Application No. 2013-090898.

* cited by examiner

*Primary Examiner* — Shawki S Ismail
*Assistant Examiner* — Bryan Gordon
(74) *Attorney, Agent, or Firm* — Holtz, Holtz & Volek PC (57) ABSTRACT

An actuator includes the first and the second extendable driver portions. The first extendable driver portion includes an electrolyte layer laminated with electrode layers each including an electroconductive polymer and expands and contracts according to application of a voltage between the electrode layers. The second extendable driver portion includes an electrolyte layer laminated with electrode layers each including an electroconductive polymer and expands and contracts according to application of a voltage between (Continued)

the electrode layers. The first and the second extendable driver portions are arranged between a fixation portion and an application portion. The application portion moves as the first and the second extendable driver portions extend and contract.

1 Claim, 6 Drawing Sheets

ACTUATOR

CROSS REFERENCE TO RELATED APPLICATION

This application is based upon and claims the benefit of priority under 35 USC 119 of Japanese Patent Application No. 2013-090898 filed on Apr. 24, 2013, the entire disclosure of which, including the description, claims, drawings and abstract, is incorporated herein by reference in its entirety.

BACKGROUND OF THE INVENTION

1. Field of the Invention

The present invention relates to an actuator.

2. Description of Related Art

Conventionally, an electromagnetic actuator comprising a coil and a permanent magnet has been generally used as an actuator.

The electromagnetic actuator is an excellent driver which moves largely, but it is difficult to miniaturize such actuator. Therefore, sometimes the actuator cannot be used for a small electric device, such as a watch, where only an actuator having a very limited shape can be mounted because a little space is set aside for the actuator.

In recent years, a piezoelectric actuator which utilizes the piezoelectric effect of a piezoelectric element (hereinafter referred to as "piezoelectric actuator") has been proposed (for example, JP2008-193893A).

As a piezoelectric actuator, a bimorph type actuator and a unimorph type actuator are commonly used. The bimorph type actuator comprises two plate-shaped piezoelectric elements bonded together. A voltage is applied on one piezoelectric element for extension while a voltage is applied on the other piezoelectric element for contraction so that the actuator bends in a direction perpendicular to the direction in which the piezoelectric elements extends (i.e. direction perpendicular to bonding faces of the piezoelectric elements). The unimorph type actuator comprises a plate-shaped piezoelectric element bonded to one side of a metal plate. A voltage is applied to this piezoelectric element to make it expand and contract so that the actuator bends. The bend (displacement) caused by extension and contraction of the piezoelectric elements is utilized to drive a gear, etc.

However, conventional piezoelectric actuators usually adopted a plate-shaped piezoelectric element which comprises electrode layers bonded on both sides of a piezoelectric ceramic material such as lead zirconate titanate (PZT). Therefore the bend (displacement) according to extension and contraction of the piezoelectric elements is small. Also, these actuators have further problems—for example, a high voltage is needed.

In recent years, a plate-shaped thin electroconductive polymer actuator has been developed. This actuator comprises an electrolyte layer between electrode layers. When a voltage is applied to the electroconductive polymer actuator, ions move in the electrolyte layer and molecules around the electrodes expand so that the actuator physically changes its shape causing bend (displacement) at its plate-shaped portion.

In such configuration of the actuator, the plate-shaped portion is displaced by application of a relatively low voltage. In addition, the configuration is simple, and bend (displacement) of the plate-shaped portion is relatively large. Such actuator is expected to be an efficient driver.

SUMMARY OF THE INVENTION

According to a first aspect of the present invention, there is provided an actuator including at least a first extendable driver portion which includes an electrolyte layer laminated with electrode layers each including an electroconductive polymer and which expands and contracts according to application of a voltage between the electrode layers, and a second extendable driver portion which includes an electrolyte layer laminated with electrode layers each including an electroconductive polymer and which expands and contracts according to application of a voltage between the electrode layers, wherein the first and the second extendable driver portions are arranged between a fixation portion and an application portion, and wherein the application portion moves as the first and the second extendable driver portions extend and contract.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein:

FIG. 2A and FIG. 2B are schematic plan views showing an example in which the actuator in FIG. 1 is adopted as a driver mechanism that rotates a gear, wherein FIG. 2A shows a state where a voltage is not applied while FIG. 2B shows a state where a voltage is applied;

DETAILED DESCRIPTION OF THE PREFERRED EMBODIMENT

First Embodiment

Hereinafter, the first embodiment of an actuator according to the present invention will be described referring to FIG. 1A, FIG. 1B, FIG. 2A and FIG. 2B.

The actuator of this embodiment is utilized to rotate a gear which constitutes, for example, a hand mechanism that operates hands, a date mechanism, etc. of a watch. However, application of the actuator according to the present invention is not limited to these.

Figure 1A:
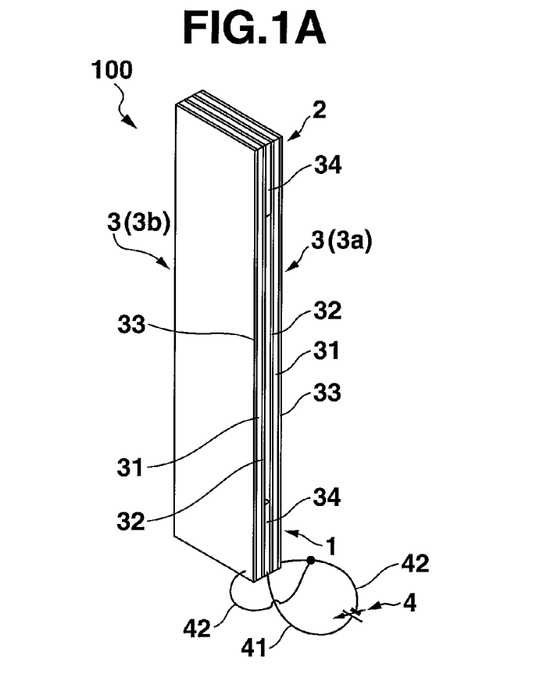
FIG. 1A is a perspective view of an actuator according to the first embodiment showing a state where a voltage is not applied.
Figure 1B:
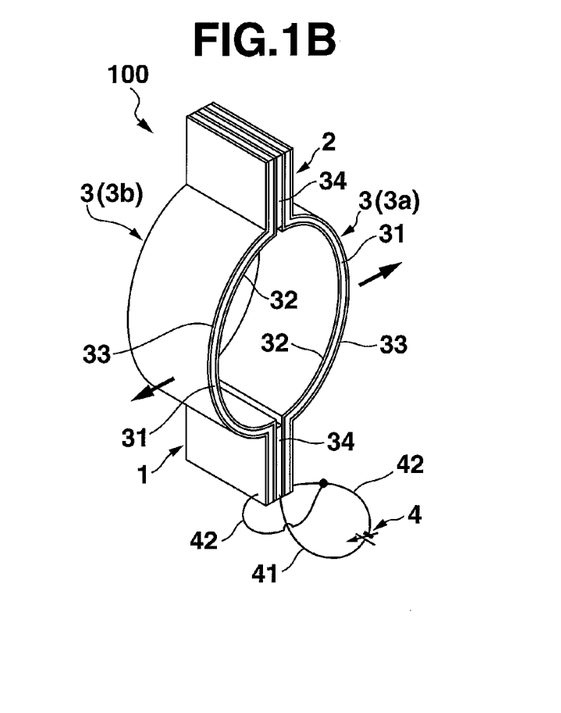
FIG. 1B is a perspective view of the actuator according to the first embodiment showing a state where a voltage is applied.

FIG. 1A and FIG. 1B are perspective views of an actuator according to this embodiment. As described later, the actuator 100 is configured to extend and contract according to application of a predetermined voltage on electrode layers 32, 33. FIG. 1A shows a state where a voltage is not applied while FIG. 1B shows a state where a voltage is applied.

In this actuator 100, extendable driver portions are arranged between a fixation portion and an application portion. The actuator 100 is configured such that the application portion moves as the extendable driver portions extend and contract.

In this embodiment, as shown in FIG. 1A and FIG. 1B, the actuator 100 includes the fixation portion 1, the application portion 2 and the two elongated and plate-shaped extendable driver portions 3a, 3b arranged between the fixation portion 1 and the application portion 2. Hereinafter, "extendable driver portions 3" include the extendable driver portions 3a, 3b.

The ends of the extendable driver portion 3a in the longitudinal directions are bonded to the ends of the extendable driver portion 3b as described later. The fixation portion 1 fixes one end of the extendable driver portions 3a, 3b (in this embodiment, two portions), which are bonded together, at a predetermined position in a watch housing where the extendable driver portions 3a, 3b are fitted.

The application portion 2 is arranged at the other end of the extendable driver portions 3a, 3b (in this embodiment, two portions), which are bonded together. The application portion 2 moves according to extension and contraction of the extendable driver portions 3a, 3b which are caused by application of a voltage between the electrode layers 32, 33 which will be described later.

Specifically, the application portion 2 moves toward and away from the fixation portion 1 (i.e. up and down direction in FIG. 1A, FIG. 1B, FIG. 2A and FIG. 2B) as the extendable driver portions 3a, 3b extend and contract.

Each of the extendable driver portions 3a, 3b includes an electrolyte layer and electrode layers made of electroconductive polymers. In this embodiment, the electrode layers 32, 33 are layered respectively on both sides of the electrolyte layer 31 to form a three-layer construction. The extendable driver portions 3a, 3b are plate-shaped and expand and contract according to application of a voltage between the electrode layers 32, 33.

The electrolyte layer 31 is, for example, a gel electrolyte which includes ordinary temperature molten salt in a polymer matrix. Known flexible polymers can be adopted as the polymer matrix. Specifically, a polyamide, a polyester, a polyvinyl alcohol, a polyvinyl acetate, a polyacrylic acid and other esters, a polyacrylamide, a polystyrene, a polyurethane, a polyvinylidene fluoride, a polyethylene oxide, a polypropylene oxide, etc. can be adopted. Each of these polymers are solely used or are used after being mixed with another or after being cross-linked with another. A material that constitutes the electrolyte layer 31 is not limited to these examples.

The electrode layers 32, 33 are formed in a film-shape on the electrolyte layer 31 and include an electroconductive polymer and an electroconductive material.

Ions can be doped into or removed from the electroconductive polymer when oxidation-reduction reaction is caused by application of a voltage. For example, when a voltage is applied between the electrode layers 32, 33 so that ions are doped, one of the electrode layers 32, 33 which is connected to a negative pole expands. When ions are removed, the electrode layer contracts till the initial state.

As the electroconductive polymer which constitutes the electrode layers 32, 33, known electroconductive polymers such as a polyaniline, a polypyrrole, a polythiophene, a derivative of one of these, or a mixture of derivatives of these can be adopted.

The electroconductive material electrically connects with the electroconductive polymer to improve electronic conductivity of the electroconductive polymer.

A carbon material, metal, etc. are adopted as the electroconductive material. These materials have high electroconductivity, resistance against a solvent and electrochemical stability within an electric potential range where oxidation-reduction of the electroconductive polymer takes place. For example, a carbon fiber, non-crystalline carbon, graphite, gold, platinum, palladium, etc. can be adopted as the electroconductive material.

The electroconductive material is in a powder form, a netlike form or a porous form so that the electroconductive material do not disturb action of the electroconductive polymer when the electroconductive polymer expands or contracts in oxidation-reduction. The electroconductive material constitutes the electrode layers 32, 33 and is electrically contacting the electroconductive polymer.

Specifically, each of the electrode layers 32, 33 may be a CNT electrode constituted by carbon nano tubes (CNT) arranged in a sheet shape.

Configuration of the electrode layers 32, 33, materials adopted as the electroconductive polymer or the electroconductive material, etc. are not limited to the above examples.

The extendable driver portions 3a, 3b (in this embodiment, two portions) are connected to each other at the application portion 2.

That is to say, as shown in FIG. 1A and FIG. 1B, one of the electrode layers of the extendable driver portion 3a faces one of the electrode layers of the extendable driver portion 3b (in this embodiment, the electrode layer 32 of each extendable driver portion 3a, 3b), and the ends of the extendable driver portion 3a in the longitudinal direction are bonded to the ends of the extendable driver portion 3b via electroconductive adhesive layers 34. The electrode layers (the electrode layer 32 or 33) may physically contact with each other. Thereby the two extendable driver portions 3a, 3b are joined together at the application portion 2 to form a loop shape.

A leading wire 41 is connected to the inner side—the side that is bonded by the adhesive layer 34—of each electrode layer 32, 32 of the two extendable driver portions 3a, 3b near the fixation portion 1. A common electrode portion (common electrode pad—not shown in drawings) which makes contact with both electrode layers 32, 32 on the inner sides of the two extendable driver portions 3a, 3b may be provided in the adhesive layer 34 so that the leading wire 41 is connected to the common electrode portion.

A leading wire 42 is connected to the outer side—the side opposite to the bonded portion—of each electrode layer 33, 33 of the two extendable driver portions 3a, 3b near the fixation portion 1. An electrode portion (electrode pad—not shown in drawings) may be provided on each electrode layer 33 so that the leading wire 42 is connected to the electrode portion.

The electrode layers 32, 33 are connected to the power source 4 via the leading wires 41, 42 respectively so that a voltage is applied by the power source 4.

Figure 2A:
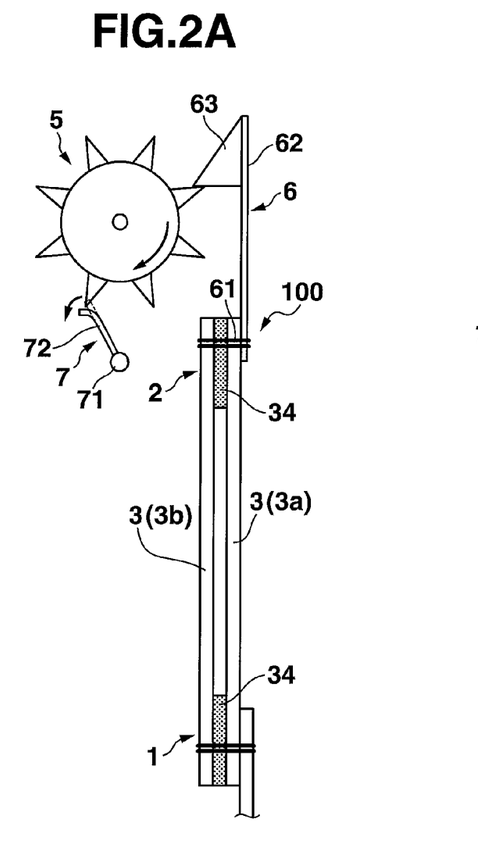
Figure 2B:
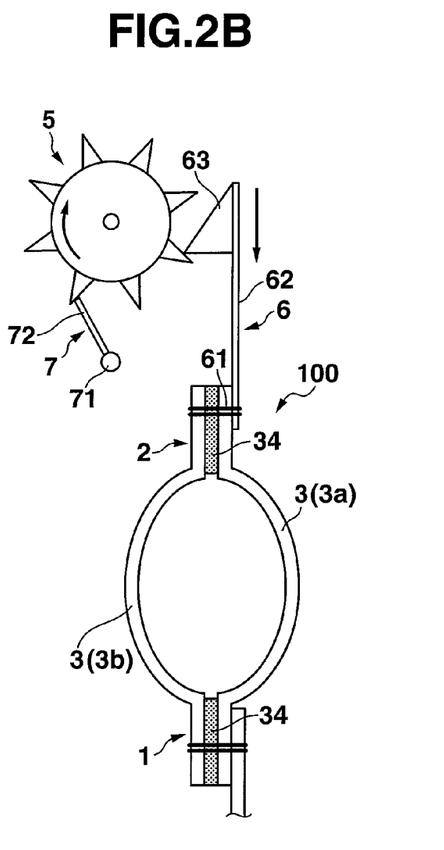

As shown in FIG. 1A and FIG. 2A, when a voltage is not applied between the electrode layers 32, 33 by the power source 4 (initial state), the extendable driver portions 3a, 3b extends to be plate-shaped so that the distance between the fixation portion 1 and the application portion 2 of the actuator 100 is at the longest. As shown in FIG. 1B and FIG. 2B, when a voltage is applied between the electrode layers 32, 33 by the power source 4, the extendable driver portions 3a, 3b contract so that the distance between the fixation portion 1 and the application portion 2 gets shorter.

As described above, when a voltage is applied, the sides of the electrode layers 32, 33 that connect with the negative pole of the power source 4 expand. In this embodiment, as shown in FIG. 1B, the negative pole of the power source 4 is connected to the electrode layers 33, 33 so that the electrode layers 33, 33 of the two extendable driver portions 3a, 3b expand when a voltage is applied. Thereby, as shown in FIG. 1B and FIG. 2B, the extendable driver portions 3a, 3b are drawn outside to be circle-shaped so that the application portion 2 gets close to the fixation portion 1 in comparison with the initial state where a voltage is not applied.

FIG. 2A and FIG. 2B are schematic plan views showing an example in which the actuator in FIG. 1 is adopted as a driver mechanism which rotates a gear. FIG. 2A shows a state where a voltage is not applied. FIG. 2B shows a state where a voltage is applied.

As shown in FIG. 2A and FIG. 2B, an operation member 6 which contacts and drives a driving subject such as a gear 5 is fixed to the application portion 2 in this embodiment.

In this embodiment, the operation member 6 is fixed to the operation portion 2 by winding a string-like attachment member 61 around the operation member 6 and the operation portion 2. A method for fixing the operation member 6 to the application portion 2 is not limited to this. For example, an adhesive, etc. can be used for fixation.

In this embodiment, the operation member 6 includes a support portion 62 and a hook 63 attached at one end (free end) of the support portion 62. The support portion 62 is fixed to the application portion 2 such that the support portion 62 is approximately parallel with the longitudinal direction of the extendable driver portions 3a, 3b.

The support portion 62 is made of a somewhat elastic material such as a resin and is pushed by the gear 5 to bend outside while the operation member 6 moves upward (upward direction in FIG. 1A, FIG. 1B, FIG. 2A and FIG. 2B).

The hook 63 is a portion to be locked into a driving subject such as the gear 5. A lower edge of the hook 63 of the operation member 6 which makes contact with the gear 5 from above (upper side in FIG. 1A, FIG. 1B, FIG. 2A and FIG. 2B) extends from the support portion 62 toward the gear 5 in a direction approximately perpendicular to the support portion 62. An upper edge of the hook 63 slopes slightly toward the support portion 62 from a free end of the lower edge.

Therefore, as shown in FIG. 2A and FIG. 2B, when the operation member 6 moves downward, the end of the lower edge of the hook 63 is securely locked into the gear 5 so that the gear 5 can be pushed from above. When the operation member 6 moves upward, the upper edge is not locked into the gear 5 even when the gear 5 makes contact with the upper edge. This is because the operation member 6 is pushed outward by the gear 5 until the upper edge of the hook 63 goes over the gear 5 while the support portion 62 bends outward according to inclination of the slope to release the hook 63 outward.

To use the actuator 100 as a driver that rotates the gear 5, a stopper mechanism that prevents counter rotation of the gear 5 in the above operation must be also provided. Hereinafter, an example of this stopper mechanism will be described.

In this embodiment, as the stopper mechanism, a stopper member 7 which locks into the gear 5 to prevent counter rotation of the gear 5 is located downstream from the hook 63 of the gear 5 in the rotation direction of the gear 5.

This embodiment shows an example wherein the gear 5 rotates clockwise as the hook 63 pushes the gear 5. In this example, the stopper member 7 is located on the left side of the hook 63 of the operation member 6.

The stopper member 7 includes a fixed portion 71 and a stick-shaped lock portion 72 fixed to the fixed portion 71. The lock portion 72 is made of a somewhat elastic material such as resin. As shown in FIG. 2A, when the gear 5 rotates clockwise, the lock portion 72 is flipped by the gear 5 so as to be bent outward. Therefore, when the gear 5 rotates clockwise, the gear 5 rotates over the lock portion 72. On the contrary, as shown in FIG. 2B, when the gear 5 is on the point of rotating counterclockwise, the lock portion 72 makes contact with the lower side of the gear 5 to prevent counter rotation of the gear 5.

Configuration of the stopper mechanism can be other than this example as long as the stopper mechanism prevents counter rotation of the gear 5.

Next, operation of the actuator 100 according to this embodiment will be described referring to FIG. 1A, FIG. 1B, FIG. 2A and FIG. 2B.

As shown in FIG. 1A and FIG. 2A, in a state where a voltage is not applied between the electrode layers 32, 33 by the power source 4 (initial state), each of the extendable driver portions 3a, 3b extends in a plate-shape.

As shown in FIG. 1B and FIG. 2B, when a voltage is applied between the electrode layers 32, 33 of each extendable driver portion 3a, 3b by the power source 4, the electrode layers 33 of the extendable driver portions 3a, 3b, which connect with the negative pole of the power source 4, expand to spread outward so that the extendable driver portions 3a, 3b form a circle on which the fixation portion 1 and the application portion 2 are opposite to each other. Thereby the extendable driver portions 3a, 3b shortens in the direction they extend so that the distance between the fixation portion 1 and the application portion 2 gets shorter. In this while, the lower edge of the hook 63 of the operation member 6, which is fixed to the application portion 2, makes contact with a tooth of the gear 5 from above and pushes the tooth down. Thereby the gear 5 rotates clockwise while going over the lock portion 72.

When application of a voltage by the power source 4 stops, the extendable driver portions 3a, 3b extend in a direction in which the application portion 2 moves away from the fixation portion 1 (upward direction in FIG. 1A, FIG. 1B, FIG. 2A and FIG. 2B) to return to the initial plate shape. In this while, the hook 63 of the application member 6 is pushed outward by a tooth of the gear 5. However, the support portion 62 bends to release the hook 63 outward (to the right in FIG. 2A and FIG. 2B) and does not apply rotation force for counter rotation (counterclockwise) to the gear 5. Also, the lock portion 72 of the stopper member 7 makes contact with the lower side of a tooth of the gear 5 to prevent counter rotation of the gear 5.

Thus, according to the actuator 100, as voltages are intermittently applied between the electrode layers 32, 33 of the extendable driver portions 3a, 3b, the extendable driver portions 3a, 3b extend and contract repeatedly so that the application portion 2 moves linearly. Thereby, the gear 5 is rotated clockwise by a predetermined angle every time the extendable driver portions 3a, 3b contract. Thus the extendable driver portions 3a, 3b function as a driver for rotating the gear 5.

As described above, according to this embodiment, each extendable driver portion 3a, 3b includes electrode layers 32, 33 on both sides of the electrolyte layer 31 and extends and contracts as a voltage is applied between the electrode layers 32, 33. A plurality of extendable driver portions 3a, 3b are located between the fixation portion 1 and the application portion 2 and are joined together at the application portion 2.

Thus the application portion 2 and the operation member 6 connected thereto are stably supported by the two extendable driver portions 3a, 3b.

As the extendable driver portions 3a, 3b extend and contract, the application portion 2 moves in the direction in which the extendable driver portions 3a, 3b extend. Therefore the extension and contraction motion of the extendable driver portions 3a, 3b can be utilized as a linear motion without separately providing a mechanism that converts motion of an extendable driver portion into a linear motion, which has been necessary in conventional actuators. Accordingly, a simple, compact and light actuator capable of stable linear drive is achieved.

Since the gear 5 is rotated by such a linear motion, precise drive control such as rotating a gear precisely by a fixed angle or keeping the gear at a predetermined position is possible. The actuator 100 can be adopted as a driver of a precision machine such as one that drives a gear constituting a hand mechanism or a date mechanism of a watch.

In this embodiment, each of the extendable driver portions 3 is constituted by the two plate-shaped extendable driver portions 3a, 3b bonded together. Therefore the configuration is simple and manufacture of the extendable driver portions 3a, 3b is easy.

Second Embodiment

Next, the second embodiment of the actuator according to the present invention will be described referring to FIG. 3A and FIG. 3B. Since this embodiment differs from the first embodiment in the extendable driver portions 203a, 203b, hereinafter, difference from the first embodiment will be explained especially.

Figure 3A:
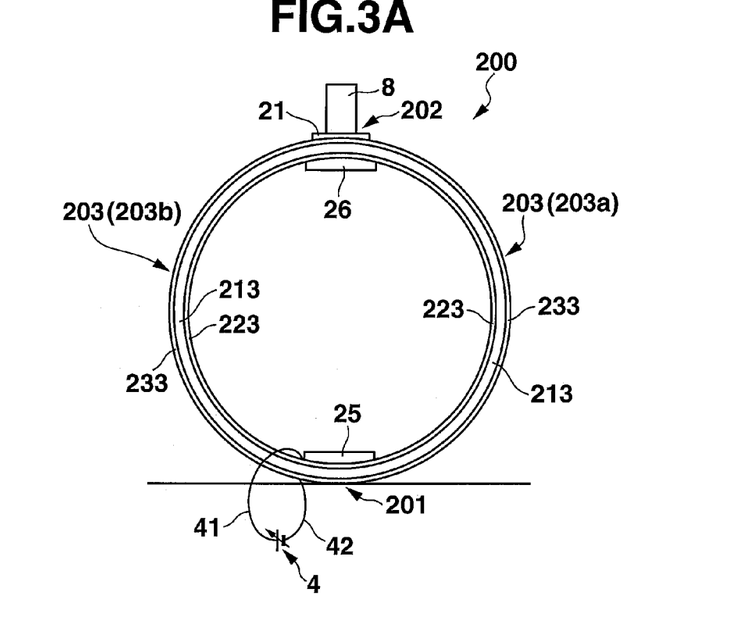
FIG. 3A is a plan view of an actuator according to the second embodiment.
Figure 3B:
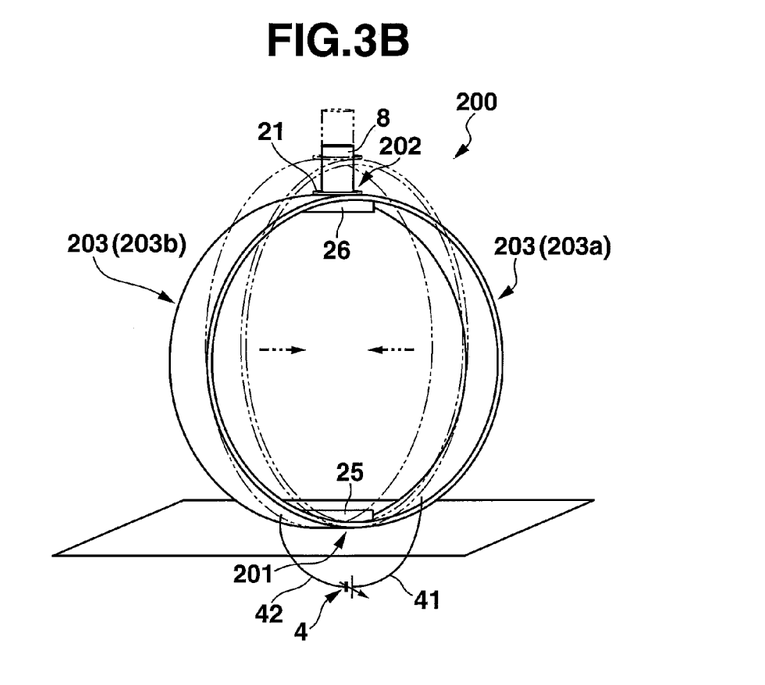
FIG. 3B is a perspective view showing extension and contraction of the actuator in FIG. 3A which are caused by application of a voltage.

FIG. 3A is a plan view of the actuator according to this embodiment, and FIG. 3B is a perspective view showing extension and contraction of the actuator according to application of a voltage.

As shown in FIG. 3A and FIG. 3B, according to the actuator 200 of this embodiment, extendable driver portions 203 (in this embodiment, two extendable driver portions 203a, 203b) are connected to each other at an application portion 202 to form a circle. A fixation portion 201 and an application portion 202 are arranged to be opposite to each other on the circle of the extendable driver portions 203. The fixation portion 201 is fixed at an inner portion, etc. of a device where the fixation portion 201 is mounted via an adhesive layer, etc., which is not shown in drawings.

In this embodiment, the extendable driver portion 203 is constituted by a circle-shaped (loop-shaped) material of one body which has no end. The two extendable driver portions 203a, 203b are in line symmetry with respect to the center line of the circle that connects the fixation portion 201 and the application portion 202.

Like the first embodiment, each extendable driver portion 203a, 203b includes an electrolyte layer and electrode layers each made of a electroconductive polymer. In this embodiment, the electrode layers 223, 233 are respectively layered on both sides of the electrolyte layer 213 to form a three-layer construction.

A leading wire 41 is connected to the electrode layer 223 on the inner side the circle-shaped extendable driver portion 203 while another leading wire 42 is connected to the electrode layer 233 on the outer side of the circle-shaped extendable driver portion 203.

The leading wires 41, 42 are connected to a power source 4. When a voltage is applied by the power source 4, the electrode layer 223 connected to the leading wire 41 is on the positive pole side while the electrode layer 233 connected to the leading wire 42 is on the negative pole side.

When a voltage is applied between the electrode layers 223, 233 of each extendable driver portion 203a, 203b, the electrode layer 233 connected to the negative pole of the power source 4 extends so that the extendable driver portions 203a, 203b extend upward (upward direction in FIG. 3A and FIG. 3B). When application of a voltage stops, the extendable driver portions 203a, 203b contract to return to the former initial state (in this embodiment, the state where the extendable driver portion 203 become approximately circular as shown in FIG. 3A and FIG. 3B).

As the extendable driver portions 203a, 203b extend and contract as such, the application portion 202 moves linearly toward and away from the fixation portion 201 (that is, up and down direction in FIG. 3A and FIG. 3B).

That is to say, when a voltage is applied by the power source 4, the application portion 202 moves away from the fixation portion 201 as shown by a chain line in FIG. 3B. When application of a voltage stops, the application portion 202 moves toward the fixation portion 201 to return to the former initial position as shown by a solid line in FIG. 3B.

A protruding operation member 8 is arranged at the substantially center part of the application portion 202.

The operation member 8 moves linearly toward and away from the fixation portion 201 (up and down direction in FIG. 3A and FIG. 3B) as the application portion 202 moves. An end portion of the operation member 8 moves toward and away from a driving subject such as a gear, which is not shown in drawings, to make the gear, etc. perform action such as rotation.

The operation member 8 is fixed on the application portion 202 via an adhesive layer 21. Means for fixing the operation member 8 on the application portion 202 is not limited to an adhesive.

In this embodiment, a reinforcement portion 25 is provided on the inner side of the fixation portion 201 (side where the electrode layer 223 is provided). The reinforcement portion 25 is made by providing an adhesive layer which hardens and fixes the fixation portion 201, by adhering a thin metal plate or the like, etc. The reinforcement portion 25 fixes the fixation portion 201 such that the fixation portion 201 does not easily bend and also fixes the electrode layers 223, 233 at the fixation portion 201 such that the electrode layers 223, 233 keep the substantially same form. Since the reinforcement portion 25 is provided on the inner side of the fixation portion 201 as such, when physical deformation, etc. occurs in one of the extendable driver portions 203a, 203b, bending occurs exclusively around the reinforcement portion 25 and the physical deformation does not reach the other side of the extendable driver portions 203a, 203b across the fixation portion 201.

In this embodiment, a reinforcement portion 26 is provided on the inner side of the application portion 202 (side where the electrode layer 223 is provided). Like the reinforcement portion 25 provided on the fixation portion 201, the reinforcement portion 26 fixes the application portion 202 such that the application portion 202 does not easily bend and also fixes the electrode layers 223, 233 at the application portion 202 such that the electrode layers 223, 233 keep the substantially same form. The reinforcement portion 26 is made by providing an adhesive layer which hardens and fixes the application portion 202, by adhering a thin metal plate or the like, etc.

Since the reinforcement portion 26 is provided, when physical deformation, etc. occurs in one of the extendable driver portions 203a, 203b, the application portion 202 absorbs the deformation. Thus a deformation on one side of the extendable driver portions 203a, 203b does not reach the other side. Therefore the operation member 8 stably moves toward and away from the fixation portion 201.

Since the fixation portion 201 and the application portion 202 are fixed with the reinforcement portions 25, 26, when the electrode layers 223, 233 physically bends, deformation occurs exclusively around the reinforcement portions 25, 26. The extendable driver portion 203 cannot keep a circular form and extends in up and down direction in FIG. 3A and FIG. 3B to be an elliptic form as shown by a chain line in FIG. 3B.

Alternatively, the adhesive layer 21 which fixes the operation member 8 on the application portion 202, an adhesive layer which fixes the fixation portion 201 inside a device or the like, etc. may serve as a reinforcement portion that prevents the fixation portion 201 and the application portion 202 from bending.

Since the other configuration is the same as the first embodiment, the same numeral are given to the same members and explanation thereof is omitted.

Next, operation of the actuator 200 according to this embodiment will be described referring to FIG. 3A and FIG. 3B.

As shown in FIG. 3A and FIG. 3B, in the state where a voltage is not applied between the electrode layers 223, 233 by the power source 4 (initial state), the extendable driver portion 203 as a whole is substantially circular.

When a voltage is applied between the electrode layers 223, 233 of the extendable driver portions 203a, 203b by the power source 4, the electrode layer 233 of the extendable driver portions 203a, 203b, which connects with the negative pole of the power source 4, expands so that the whole extendable driver portion 203 extends in a direction in which the application portion 202 moves away from the fixation portion 201 (upward direction in FIG. 3B) to be substantially elliptic as shown by a chain line in FIG. 3B.

When application of a voltage stops, the whole extendable driver portion 203 contracts in a direction in which the application portion 202 moves toward the fixation portion 201 (downward direction in FIG. 3B) to return to the initial state where the extendable driver portion 203 is circular. Also the application portion 202 returns to the initial position.

Thus, according to the actuator 200, as a voltage is intermittently applied between the electrode layers 223, 233 of the extendable driver portions 203a, 203b, the extendable driver portions 203a, 203b extend and contract repeatedly as shown in FIG. 3B, which makes the application portion 202 move linearly.

As the application portion 202 moves in this way, the operation member 8 moves toward and away from the fixation portion 201 (up and down direction in FIG. 3B). Thus the operation member 8 moves toward and away from a driving subject such as a gear to carry out operation such as providing the gear with a turning force.

As described above, this embodiment achieves the following effect as well as the same effect as the first embodiment.

In this embodiment, the extendable driver portions 203a, 203b form a circle shape with no end. Therefore the extendable driver portions 203a, 203b are constituted by a few parts and have simple configuration. The actuator 200 can be easily made at low cost.

The two circular-arc-shaped extendable driver portions 203a, 203b of the actuator 200 are arranged in line symmetry to form a circle shape (loop shape) as a whole. The application portion 202 is located at the top of the circle, and the two extendable driver portions 203a, 203b support each other and also support the application portion 202. Accordingly, as the extendable driver portions 203a, 203b extend and contract, the application portion 202 stably moves linearly along the direction in which the extendable driver portions 203a, 203b extend and contract. Thus an actuator capable of stable linear driving is achieved.

In this embodiment, the extendable driver portion 203 constituted by a circle-shaped (loop-shaped) material of one body which has no end is exemplified, but configuration of the extendable driver portion 203 is not limited to this.

For example, the two extendable driver portions 203a, 203b may be made by bonding two plate-like and physically separated extendable driver portions 203 together at the fixation portion 201 and at the application portion 202 to form a circle (loop). Alternatively, the extendable driver portions 203a, 203b may be made by bonding together the ends of one long extendable driver portion 203 having a band-shape at the fixation portion 201 or at the application portion 202 to form a circle (loop).

In this embodiment, the actuator 200 including the two extendable driver portions 203a, 203b arranged to form a circle (loop) is exemplified, but the number of the extendable driver portions provided in the actuator is not limited to two.

Figure 4:
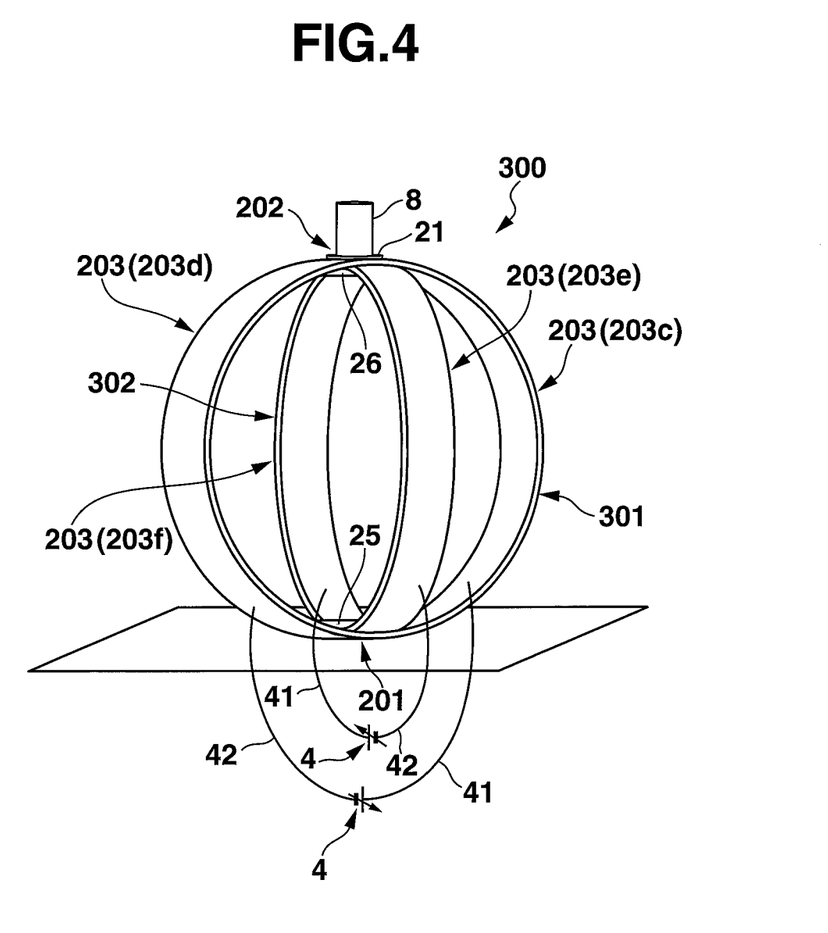
FIG. 4 is a perspective view showing extension and contraction of a variation of the actuator in FIG. 3A which are caused by application of a voltage.

For example, as shown in FIG. 4, the actuator may include four extendable driver portions 203c, 203d, 203e, 203f arranged to form circles (loops).

Specifically, the first ring 301 and the second ring 302 both having no end intersect at right angles overlapping each other at the fixation portion 201 and at the application portion 202. The first ring 301 is constituted by one circle-shaped (loop-shaped) body that includes the two extendable driver portions 203c, 203d arranged in line symmetry with regard to the center line of the circle that connects the fixation portion 201 and the application portion 202. The second ring 302 is constituted by one circle-shaped (loop-shaped) body that includes the two extendable driver portions 203e, 203f arranged in line symmetry with regard to the center line of the circle that connects the fixation portion 201 and the application portion 202.

In the example in FIG. 4, the first and the second rings 301, 302 overlap each other such that the second ring 302 is inside the first ring 301. To smoothly overlap two rings 301, 302, the diameter of the second ring 302 (that is, the inner ring) constituted by the extendable driver portions 203e, 203f is preferably made slightly smaller than the diameter of the first ring 301 (that is, the outer ring) constituted by the extendable driver portions 203c, 203d.

As described above, circle-shaped members overlap each other such that the four extendable driver portions 203c, 203d, 203e, 203f are connected to each other at the application portion 202. In this case, the number of the extendable driver portions 203 is twice as large as the number in the case where only two extendable driver portions 203a, 203b are provided, and the application portion 202 is provided with forces in four directions.

Therefore the actuator 300 generates a torque which is approximately four times larger than a torque in a case where one extendable driver portion 203 displaces the application portion 202, and which is approximately two times larger than a torque in a case where two extendable driver portions 203a, 203b displace the application portion 202 as shown in the above embodiment.

Since the first and the second rings 301, 302 overlap each other intersecting at right angles, the portions of the extendable driver portion 203 that extend and contract do not overlap or disturb each other. Therefore the torque is made larger without losing the driving velocity.

In addition to the case where the actuator is provided with four extendable driver portions 203c, 203d, 203e, 203f, the number of the extendable driver portions can be further increased. Also in such a case, the torque can be made larger without losing the driving velocity by overlapping the extendable driver portions 203 such that the portions that extend and contract do not overlap each other.

The extendable driver portions 203c, 203d, 203e, 203f of the actuator is not limited to the ones that constitute the first ring 301 and the second ring 302 both having no end.

For example, the four extendable driver portions 203c, 203d, 203e, 203f may be made by bonding two plate-like and physically separated extendable driver portions 203 together at the fixation portion 201 and at the application portion 202 to form a circle (loop).

Alternatively, the extendable driver portions 203c, 203d, 203e, 203f may be made by bonding together the ends of one long extendable driver portion 203 having a band-shape at the fixation portion 201 or at the application portion 202 to form a circle (loop). In this case, all the extendable driver portions 203 can be constituted by the same members having the same length by bonding band-shaped extendable driver portions 203 together totally at the fixation portion 201 or totally at the application portion 202. Thereby productivity is increased.

The Third Embodiment

Next, the third embodiment of the actuator according to the present invention will be described referring to FIG. 5, FIG. 6A and FIG. 6B. Since this embodiment differs from the first embodiment in the extendable driver portions 403a, 403b, hereinafter, difference from the first embodiment will be explained especially.

Figure 5:
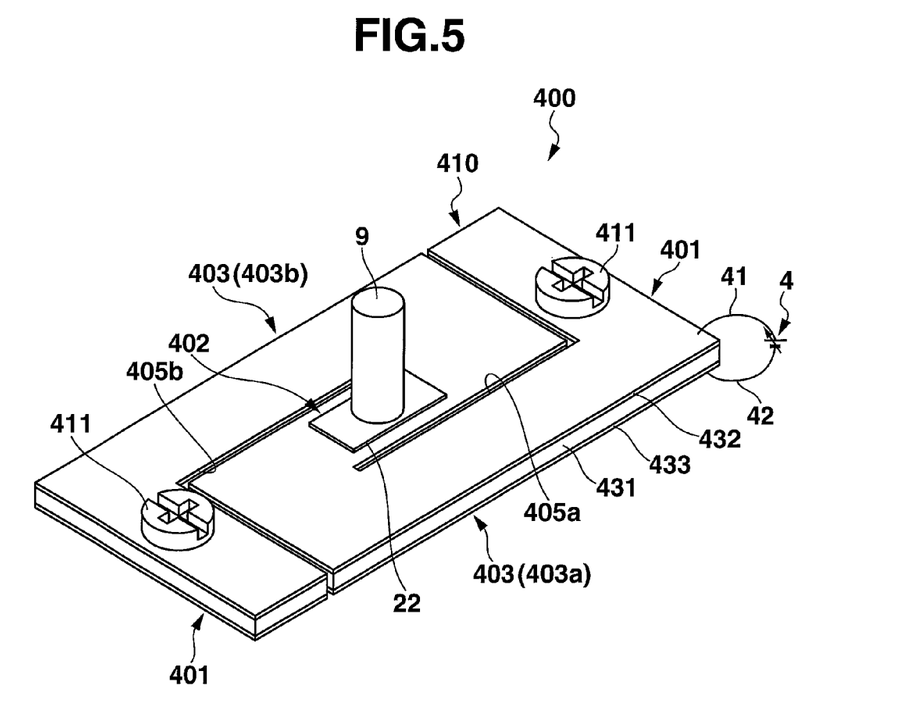
FIG. 5 is a perspective view of an actuator according to the third embodiment.

FIG. 5 is a perspective view of an actuator according to this embodiment. FIG. 6A is a side view of the actuator in a state where a voltage is not applied. FIG. 6B is a side view of the actuator in a state where a voltage is applied.

As shown in FIG. 5A, according to the actuator 400 of this embodiment, electrode layers (in this embodiment, two electrode layers 432, 433) each including an electroconductive polymer are laminated on an electrolyte layer 431 to form a rectangular thin plate 410. A pair of L-shaped slits 405a, 405b are formed in the rectangular thin plate 410 so as to pass through the rectangular thin plate 410 from the front side to the back side and to have point symmetry. Thereby a pair of fixation portions 401 opposite to each other and a pair of extendable driver portions 403 (extendable driver portions 403a, 403b) which intersect the fixation portions 401 at right angles and which are opposite to each other are formed.

In this embodiment, the fixation portion 401 is fixed at an inner portion, etc. of a device where the fixation portion 401 is mounted using a screw 411. However, a method for fixing the fixation portion 401 is not limited to this. Gluing, deposition, etc. may be carried out instead of screwing.

A leading wire 41 is connected to the electrode layer 432 arranged on the front side (that is, the upper side in FIG. 6A and FIG. 6B) of the rectangular thin plate 410 while another leading wire 42 is connected to the electrode layer 433 arranged on the back side (that is, the lower side in FIG. 6A and FIG. 6B) of the rectangular thin plate 410.

The leading wires 41, 42 are connected to a power source 4. When a voltage is applied by the power source 4, the electrode layer 432 connected to the leading wire 41 is on the positive pole side while the electrode layer 433 connected to the leading wire 42 is on the negative pole side.

Figure 6A:
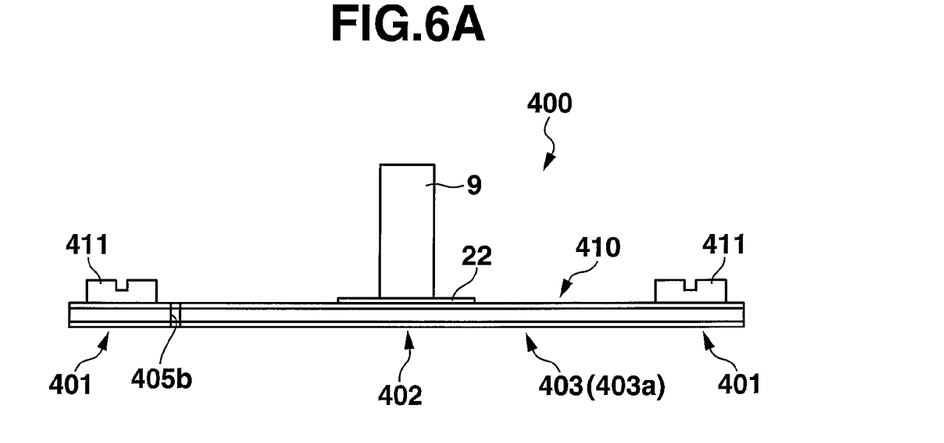
FIG. 6A is a side view of the actuator in FIG. 5 when a voltage is not applied.
Figure 6B:
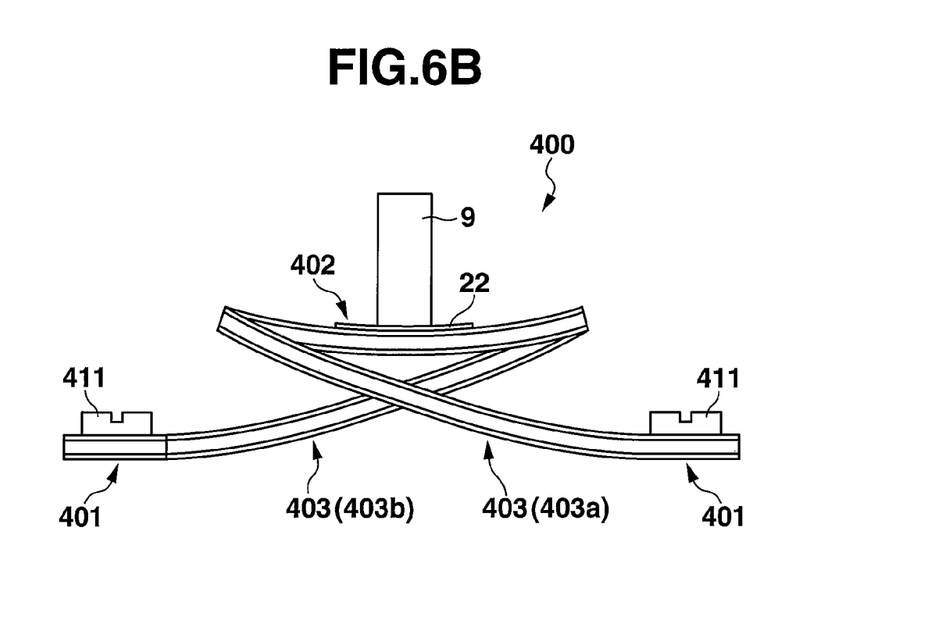
FIG. 6B is a side view of the actuator in FIG. 5 when a voltage is applied.

As shown in FIG. 6B, when a voltage is applied between the electrode layers 432, 433 of the extendable driver portions 403a, 403b, the electrode layer 433 connected to the negative pole of the power source 4 gets longer so that each of the extendable driver portions 403a, 403b bends upward (upward direction in FIG. 6A and FIG. 6B) to draw a curve extending upward from the fixation portion 401 side to the free end side. When application of a voltage stops, the extendable driver portions 403a, 403b contract to return to the former initial state (in this embodiment, the state where the extendable driver portion 403 is substantially on the same plane as the fixation portion 401 such that the whole rectangular thin plate 410 is flat as shown in FIG. 5 and FIG. 6A).

The center portion of the rectangular thin plate 410 between the pair of slits 405a, 405b serves as an application portion 402 that moves linearly in a direction perpendicular to the surface of the rectangular thin plate 410 (up and down direction in FIG. 6A and FIG. 6B) as the extendable driver portions 403a, 403b extend and contract.

When a voltage is applied between the electrode layers 432, 433 so that the extendable driver portions 403a, 403b bend upward, the application portion 402 moves upward (upward direction in FIG. 6A and FIG. 6B). When application of a voltage stops and the extendable driver portions 403a, 403b return to the initial state, the application portion 402 comes to the same plane as the fixation portion 401.

Like the second embodiment, a protruding operation member 9 is arranged at the substantially center part of the application portion 402.

The operation member 9 moves linearly in a direction perpendicular to the surface of the rectangular thin plate 410 (up and down direction in FIG. 6A and FIG. 6B) as the application portion 402 moves. An end portion of the operation member 9 moves toward and away from a driving subject such as a gear, which is not shown in drawings, to make the gear, etc. perform action such as rotation.

In this embodiment, a reinforcement portion 22 is provided on the application portion 402 around the operation member 9. Like the reinforcement portion 26 in the second embodiment, the reinforcement portion 22 fixes the application portion 402 such that the application portion 402 does not easily bend and also fixes the electrode layers 432, 433 at the application portion 402 such that the electrode layers 432, 433 keep the substantially same form. The reinforcement portion 22 is, for example, an adhesive layer that fixes the operation member 9 on the application portion 402. The reinforcement portion 22 is not limited to the adhesive layer. For example, the reinforcement portion 22 may be made by adhering a thin metal plate, etc.

Since the reinforcement portion 22 is provided, when physical deformation, etc. occurs in one of the extendable driver portions 403a, 403b, the application portion 402 absorbs the deformation. Deformation occurred in one of the extendable driver portions 403*a*, 403*b* does not reach the other of the extendable driver portions 403*a*, 403*b* across the application portion 402. Also, when a voltage is applied, the application portion 402 does not easily bend at the reinforcement portion 22 and therefore keeps the form. Accordingly, the operation member 9 stably moves toward and away from the fixation portion 401.

The reinforcement portion 22 is not essential for the present invention and can be omitted.

Since other configuration is the same as the first embodiment, the same numeral are given to the same members and explanation thereof is omitted.

Next, operation of the actuator 400 according to this embodiment will be described referring to FIG. 6A and FIG. 6B.

As shown in FIG. 5 and FIG. 6A, in a state where a voltage is not applied between the electrode layers 432, 433 of the actuator 400 by the power source 4 (initial state), the extendable driver portion 403 is on the substantially same plane as the fixation portion 401 and the whole rectangular thin plate 410 is flat (a state shown in FIG. 5 and FIG. 6A).

When a voltage is applied between the electrode layers 432, 433 of the extendable driver portions 403*a*, 403*b* by the power source 4, the electrode layer 433 of the extendable driver portions 403*a*, 403*b* which connects with the negative pole of the power source 4 expands so that each of the extendable driver portions 403*a*, 403*b* bends upward (upward direction in FIG. 6A and FIG. 6B) to draw a curve extending upward from the fixation portion 401 side to the free end side. In this while, the application portion 402 moves upward (a direction perpendicular to the surface of the rectangular thin plate 410) as the extendable driver portions 403*a*, 403*b* bend upward (see FIG. 6B).

When application of a voltage stops, the extendable driver portions 403*a*, 403*b* contract to return to the initial state where the extendable driver portions 403*a*, 403*b* are on the substantially same plane as the fixation portion 401, and the application portion 402 returns to the initial position where the application portion 402 is on the substantially same plane as the fixation portion 401.

Thus, according to the actuator 400, as a voltage is intermittently applied between the electrode layers 432, 433 of the extendable driver portions 403*a*, 403*b*, the extendable driver portions 403*a*, 403*b* extend and contract repeatedly as shown in FIG. 6A and FIG. 6B, which makes the application portion 402 move linearly.

As the application portion 402 moves in this way, the operation member 9 moves toward and away from the fixation portion 401 (up and down direction in FIG. 6B). Thus the operation member 9 moves toward and away from a driving subject such as a gear to carry out operation such as providing the gear with a turning force.

As described above, this embodiment achieves the following effect as well as the same effect as the first embodiment.

In this embodiment, the actuator 400 is made by providing the rectangular thin plate 410 with the slits 405*a*, 405*b*. Therefore the actuator 400 is constituted by a few parts, has simple configuration, and can be easily made at low cost.

Further, in the state where a voltage is applied, the extendable driver portions 403*a*, 403*b* are on the substantially same plane as the fixation portion 401 so that the whole actuator 400 is substantially flat. Therefore the actuator 400 is compact, light, easy to be placed on a plane of a base, etc. and mountable in a little housing space.

The two extendable driver portions 403*a*, 403*b* of the actuator 400 extend and contract to displace the application portion 402 up and down while supporting the application portion 402 between the extendable driver portions 403*a*, 403*b*. Accordingly, as the extendable driver portions 403*a*, 403*b* extend and contract, the application portion 402 stably moves linearly along the direction in which the extendable driver portions 403*a*, 403*b* extend and contract. Thus an actuator capable of stable linear driving is achieved.

This embodiment presents an example where a pair of the extendable driver portions 403*a*, 403*b* is made by forming a pair of the L-shaped slits 405*a*, 405*b* in the rectangular thin plate 410 so as to pass through the rectangular thin plate 410 from the front side to the back side and to have point symmetry. However, the form of the whole actuator and configuration of the extendable driver portions are not limited to this.

For example, the form of the thin plate, which is constituted by the electrolyte layer laminated with electrode layers each including an electroconductive polymer, can be not only a rectangle but also a circle, an ellipse, etc.

Though several embodiments of the present invention are described, the present invention is not limited to the above-described embodiments. Changes and modifications may be made for embodying the invention without departing from the scope of the invention.

Specifically, the above embodiments exemplifies a case where the extendable driver portions contract in the initial state, where a voltage is not applied between the electrode layers, and extend when a voltage is applied. However, the way the extendable driver portions extend and contract is not limited to the embodiments and can be modified by changing the way of voltage application or by changing configuration, settings, etc. of the electrode layers and the electrolyte layer that constitute the extendable driver portion.

For example, it is also possible that the extendable driver portion extends in the initial state, where a voltage is not applied between the electrode layers, and contracts when a voltage is applied.

The above first and the second embodiments exemplify a case where the positive pole of the power source connects with the electrode layer on the inner side of the extendable driver portion while the negative pole of the power source connects with the electrode layer on the outer side of the extendable driver portion. The third embodiment exemplifies a case where the positive pole of the power source connects with the electrode layer on the front side of the rectangular thin plate while the negative pole of the power source connects with the electrode layer on the back side of the rectangular thin plate. However, combination between the electrode layers and the positive pole and the negative pole is not limited to these embodiments. It can be modified according to configuration of the extendable driver portion and to the way of voltage application.

The above embodiments exemplify a case where each extendable driver portion is constituted by one electrolyte layer and a pair of electrode layers formed on both sides of the electrolyte layer. However, configuration of the extendable driver portion is not limited to this.

For example, a plurality of sets of the electrolyte layer and the electrode layer may be layered, each set including one electrolyte layer and a pair of electrode layers formed on both sides of the electrolyte layer. In this case, the power source connects with each set separately to apply a voltage. Also, an insulation layer is provided between the sets.

The present invention is not limited to the above embodiments and can be modified according to circumstances.

Though several embodiments of the present invention are described, the scope of the invention is not limited to the above embodiments but includes the scope of claims attached below and the scope of their equivalents.

What is claimed is:

1. An actuator, comprising:
    an extendable driver portion which includes an electrolyte layer laminated with electrode layers, each of the electrode layers including an electroconductive polymer, and the extendable driver portion being configured to expand and contract according to application of a voltage between the electrode layers;
    wherein the extendable driver portion is arranged between an application portion and a pair of fixation portions opposite to each other,
    wherein the electrode layers are laminated on the electrolyte layer to form a rectangular thin plate, and a pair of L-shaped slits are provided in the rectangular thin plate so as to pass through the rectangular thin plate from a front side to a back side,
    wherein a center portion of the rectangular thin plate between the pair of L-shaped slits serves as the application portion, and
    wherein the application portion moves in a direction perpendicular to the surface of the rectangular thin plate as the extendable driver portion extends and contracts.

* * * * *